T. D. HOOPER, Jr.
LETTERING MACHINE.
APPLICATION FILED JAN. 26, 1917.
1,292,319.
Patented Jan. 21, 1919.
4 SHEETS—SHEET 1.
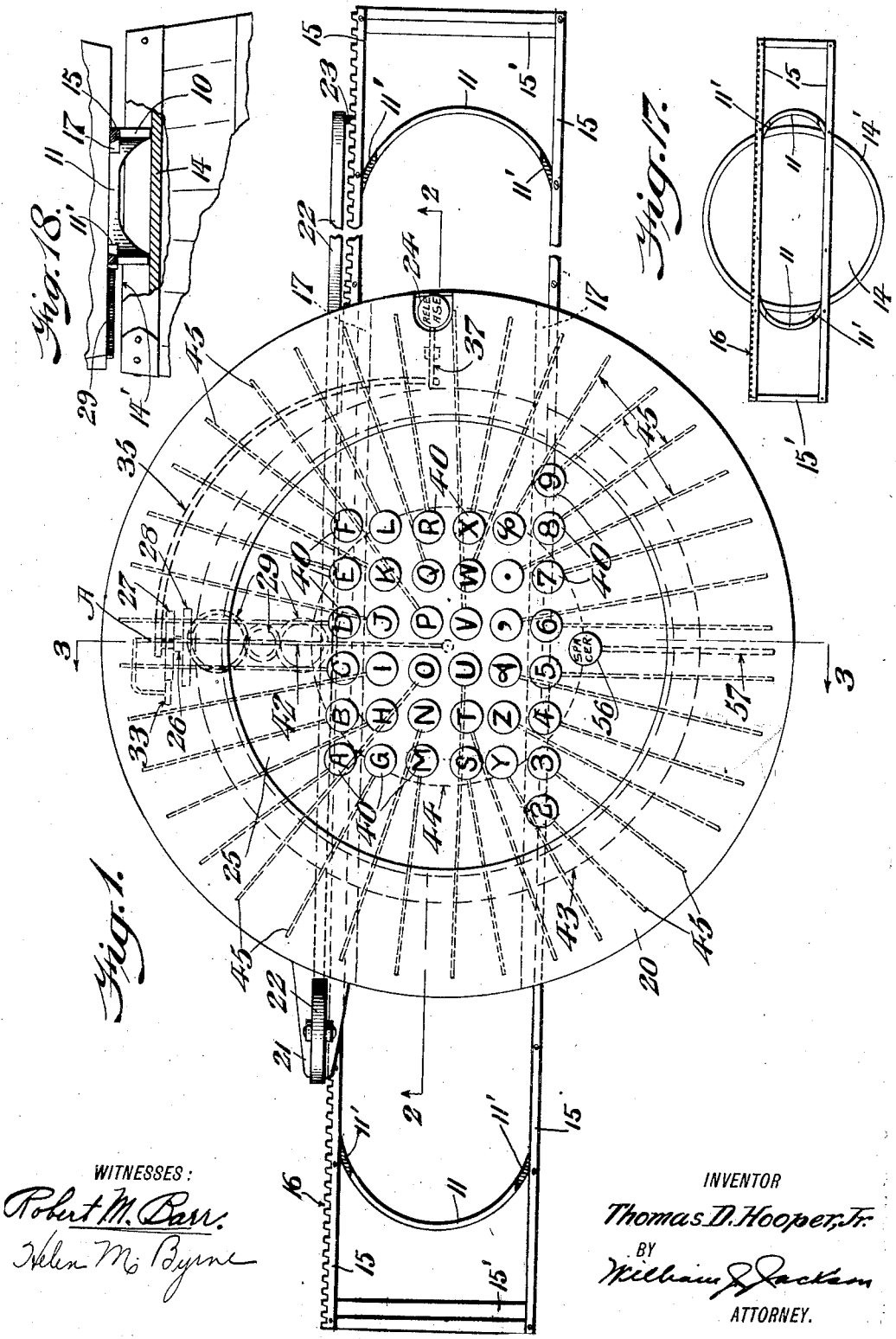
WITNESSES:
Robert M. Barr
Helen M. Byrne
INVENTOR
Thomas D. Hooper, Jr.
BY
William J. Jackson
ATTORNEY.

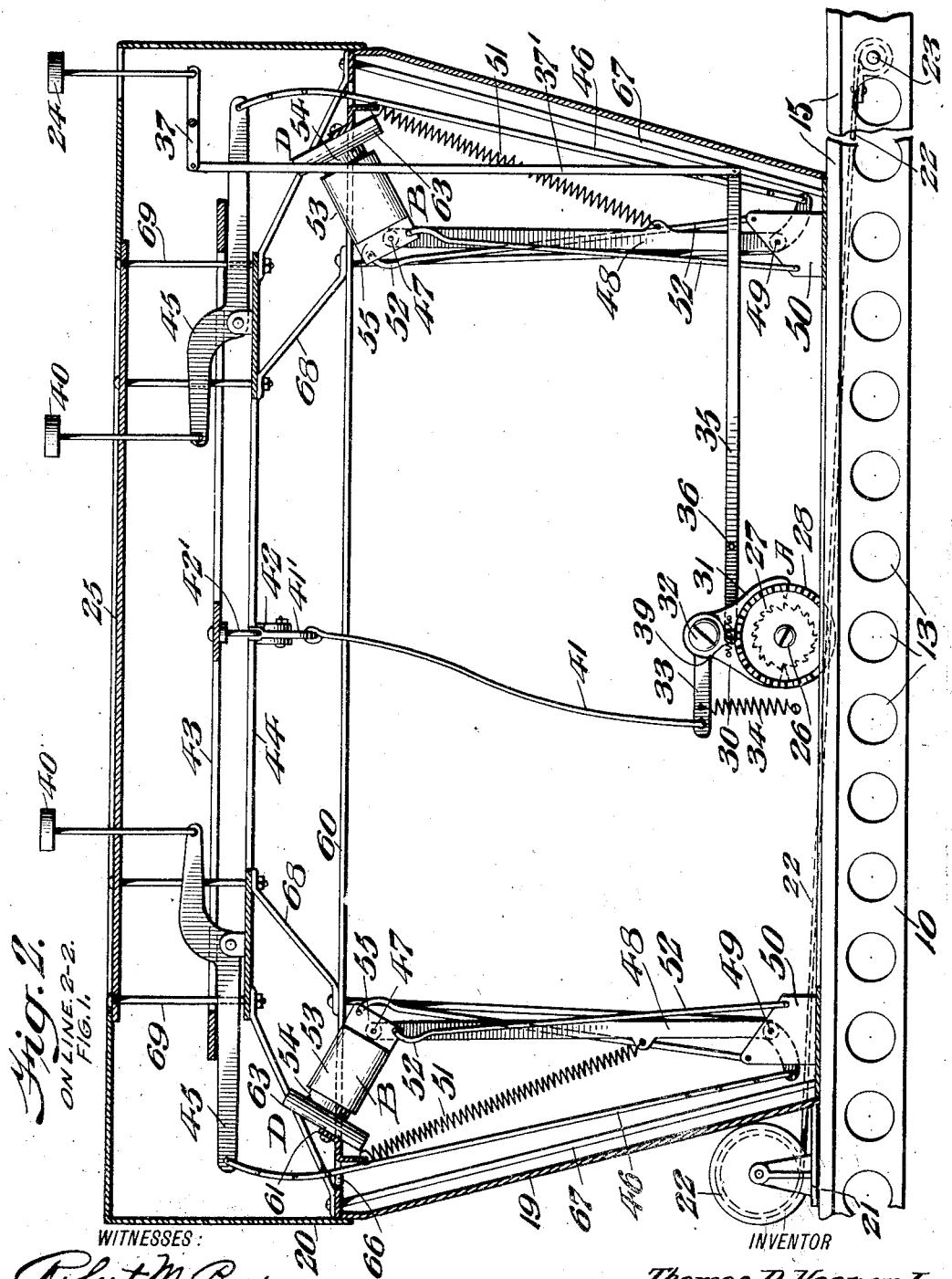

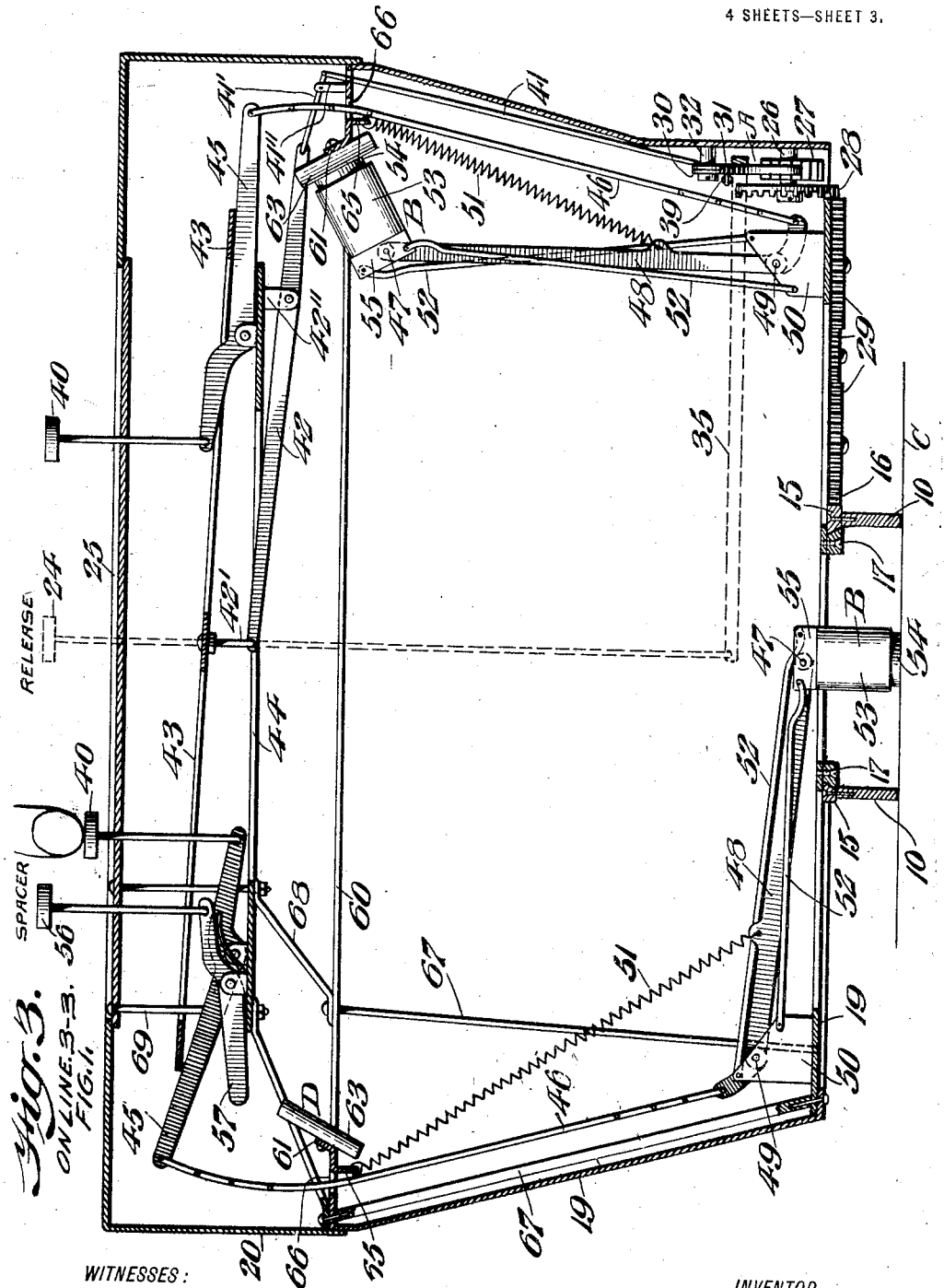

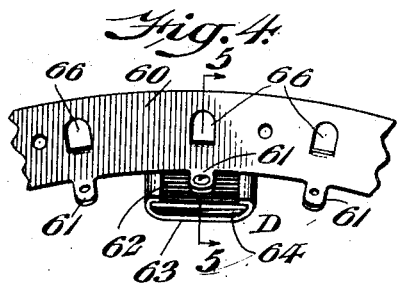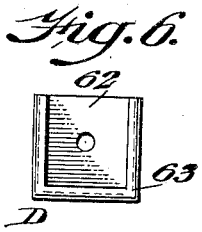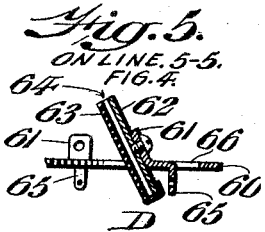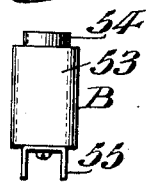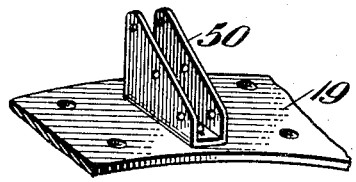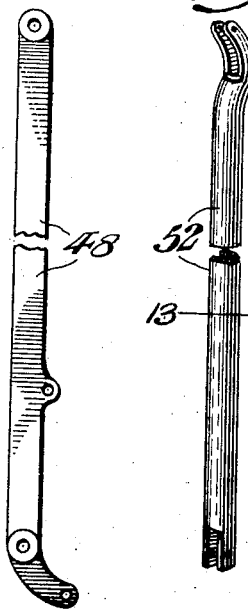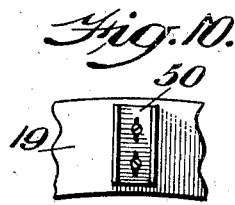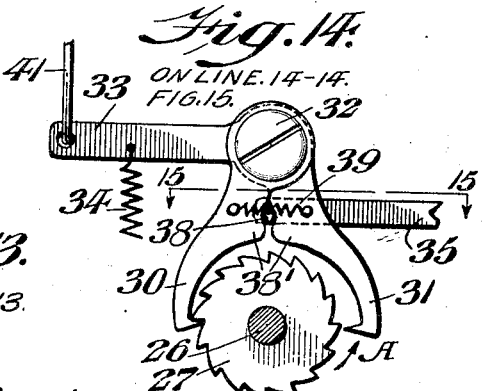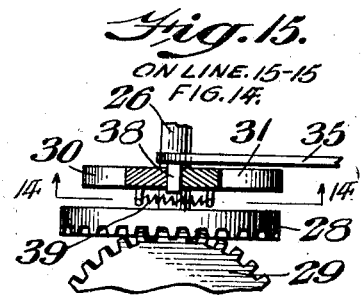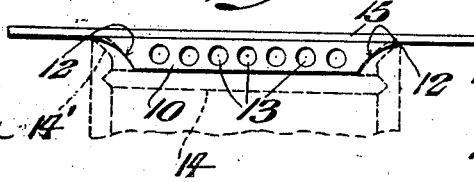

UNITED STATES PATENT OFFICE.

THOMAS D. HOOPER, JR., OF PHILADELPHIA, PENNSYLVANIA.

LETTERING-MACHINE.

1,292,319.  Specification of Letters Patent.  Patented Jan. 21, 1919.

Application filed January 26, 1917. Serial No. 144,727.

*To all whom it may concern:*

Be it known that I, THOMAS D. HOOPER, Jr., a citizen of the United States, residing at Philadelphia, county of Philadelphia, and State of Pennsylvania, have invented a certain new and useful Improved Lettering-Machine, of which the following is a specification.

This invention relates broadly considered to lettering machines and has more particular relation to that class of such machines which permit of printing upon flat surfaces without the employment of platens and specifically relates to a machine for lettering boxes, crates, barrel, keg and cask heads and similar articles of merchandise.

As now practised in the shipping room of mercantile or like establishments, boxes, crates, barrel heads and similar articles have the name of the consignee and shipping point marked or lettered thereon by hand with a paint brush or have the same delineated thereon by means of a stencil. The former method requires the services of a person more or less skilled in lettering and the latter method requires either that numerous stencils be cut by a machine upon paper or that metal stencils which are expensive in character be used. Because of their tendency to warp or curl, these latter are unhandy to use and it frequently happens that good lettering is not obtained. In all instances, the time consumed is an important item and involves considerable expense not warranted in the class of work under consideration.

The principal object of the present invention is to overcome the above recited disadvantageous features and provide a lettering machine of compact form, light structure, simple mechanism and few parts which may be readily moved from place to place and positioned upon boxes, crates, barrel heads and similar articles for printing thereon in an accurate, rapid and neat manner addresses and the like by employees more or less unskilled in lettering. A further object of the invention is to so arrange the key board of the machine that such unskilled employees may readily use the machine, the letters of the alphabet being arranged in sequential relation in contradistinction to the staggered order of arrangement of the key-board of a typewriting machine. A further object of the present invention is to dispense with the inking ribbon as employed in a typewriting machine and provide for each key a stationary ink pad, thereby greatly simplifying the construction and operation of the machine. A further object of the invention is to provide a lettering machine the base ends of which are so shaped and proportioned that the machine may be readily positioned upon the head of a barrel, cask or keg for printing purposes. With these and other objects in view as will hereinafter more fully appear, the invention consists of the improvements hereinafter described and finally claimed.

The nature, characteristic features and scope of the invention will be more fully understood from the following description taken in connection with the accompanying drawings forming part hereof and in which:

Figure 1 is a top or plan view of the lettering machine.

Fig. 2 is a view in section taken upon the line 2—2 of Fig. 1 looking in the direction of the arrows.

Fig. 3 is a similar view taken upon the line 3—3 of Fig. 1 looking in the direction of the arrows, the release key being shown in dashed lines in order to illustrate its point of connection.

Fig. 4 is a fragmentary view in plan of the ring for supporting the inking pads.

Fig. 5 is a view in section taken upon the line 5—5 of Fig. 4.

Fig. 6 is a rear view of a pad holding plate.

Fig. 7 is a side view of a type-head.

Fig. 8 is a bottom view thereof.

Fig. 9 is a fragmentary view in perspective of a key-arm support.

Fig. 10 is a top or plan view of such support.

Fig. 11 is a view in side elevation of a key-arm.

Fig. 12 is a perspective view of a key-guide.

Fig. 13 is a sectional view taken upon the line 13—13 of Fig. 12.

Fig. 14 is a similar view taken upon the line 14—14 of Fig. 15.

Fig. 15 is a similar view taken upon the line 15—15 of Fig. 14.

Fig. 16 is a view in side elevation of the base of the machine drawn to a reduced scale and mounted upon a barrel head shown in dash lines.

Fig. 17 is a top or plan view of the same, and

Fig. 18 is a fragmentary view hereinafter referred to.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings, it will be observed that the machine embraces, broadly stated, a base made up of a pair of fixed longitudinally extended rails and a releasable carriage movable therealong under spring tension. The base comprises a pair of spaced, parallel beams 10, cut away as at 13 to lighten construction and which beams are connected at each end by cross-pieces 11 formed integral therewith. The cross-pieces in plan are curved upon an arc of a circle as shown in Figs. 1 and 17 and are notched as at 11′ for a purpose to presently appear. Considered in elevation, these cross-pieces 11 are of substantially inverted U-shape as shown in Fig. 18. The purpose of the specific form of cross-pieces disclosed is so that the beams may be rigidly connected at their ends but still permit the base as a whole being placed upon a barrel head, it being understood that the beams 10 rest upon the head 14 of a barrel and that the cross-pieces overhang the chine 14′ of a barrel. Fixed upon the top of each beam 10 is a guide piece 15 of which one is toothed to provide a rack 16. These guide pieces project beyond the curved part 12 of the beams so that when the beams are positioned upon a barrel head as shown in Fig. 16, the guide pieces 15 rest upon the chine 14′ of the barrel and the curved ends of said beams are positioned inside of said chine. The extreme ends of said guide pieces 15 are connected by cross-pieces 15′. The guide pieces 15 are beveled upon their inner faces. Secured to the bottom of carriage 19 are parallel spaced, guide pieces 17, the outer faces of which are beveled for coöperative engagement with the beveled faces of the guide pieces 15. These guide pieces 17 do not extend beyond the carriage structure 19. These guide pieces 17 are accommodated by the notched parts 11′ of the cross-pieces 11 in the back and forth travel of the carriage 19. By the arrangement of parts 15—17, it will be observed that while the carriage is free to be moved back and forth, it is interlocked with respect to the base. The carriage which is adapted to move along the base under spring tension when released as will presently appear comprises a shell-like structure 19 of circular form considered in plan having a removable cover 20 centrally apertured as shown. At the lefthand side of the carriage there is fixed thereto an arm or projection 21 operatively supported upon which is a coiled spring 22 the free end of which is secured to the righthand side of the base as at 23, see Fig. 1, it being understood that in printing the movement of the carriage is from left to right. A description will now be given of the release mechanism which is designated A and is located at the back of the machine although the release key 24 is placed at the righthand side of the machine opposite the key-board 25 for convenience of operation. The key-board is located immediately below the aperture in the cover. Journaled in the carriage structure 19 is a stud shaft 26 fixed upon which is a ratchet wheel 27 and a crown gear wheel 28 which latter is in mesh with a train of gear wheels 29 mounted upon the underside of the carriage and in mesh with the rack 16 of the base of the machine, see Fig. 3. A pair of dogs 30 and 31 are present for coöperatively engaging with the ratchet wheel 27. The dogs are loosely mounted upon a fixed stud 32 and the dog 31 has fixed thereto an arm 33 connecting with which is a spring 34 for normally keeping said dog out of engagement with the ratchet wheel 27. The free end of the arm 33 is connected by means of a rod 41 with a link 41′ fulcrumed to a fixed support 41″ which latter is connected to one end of a lever 42 fulcrumed to a fixed support 42″, the other end of said lever 42 being connected to a depending member 42′ fixed to a freely tiltable disk 43. The normal position of this disk 43 is that shown in Fig. 2 or in other words it rests in horizontal position upon the arms 45 of keys 40 the disk being apertured at suitable places to permit said arms 45 to project therethrough as shown in said figure. By depressing a key 40 as shown at the lefthand side of Fig. 3, the outer end of arm 45 tilts disk 43 which tilting through member 42′, lever 42, link 41′ and rod 41 raises arm 33 and causes dog 31 to move toward the ratchet wheel 27 which movement causes dog 30 to be disengaged from a tooth and permitting ratchet wheel 27 to move in the direction of the arrow in Fig. 14 for the distance of one tooth whereupon the ratchet wheel is stopped by a tooth coming in contact with the dog 31. This movement permits carriage 19 to move by reason of spring 22 through the connecting crown-gear, gear wheel 28, gear wheels 29 and rack 16 for required distance along the base. With the release of a key 40, spring 34 returns arm 33 to place thereby returning dog 30 to engagement with a ratchet tooth and at the same time freeing dog 31 of tooth engagement. The two dogs are held in abutting relation by means of a spring 39. By the above operation, it will be observed that every time a key 40 is operated the carriage moves a predetermined distance. In conjunction with the above movement a spacer is necessary. The spacer key is designated 56 and is connected to an arm 57 fulcrumed upon the fixed support 44. The free end of the arm 57 when raised comes in contact with and tilts the disk 43 in the same manner as the keys 40 as above described and releases the ratchet wheel 27 for the space of one tooth as before described. Also in conjunction with the above movements, a release is required so that if it be desired to move the carriage forward, a quick action thereof may be effected. The release key 24 connects with one end of a fulcrumed lever 37 the other end of which lever connects by means of a rod 37' with an arm 35 formed upon an arc of a circle, see Fig. 1, and fulcrumed as at 36. The free end of said arm is provided with a wedge-shaped trip-pin 38 which normally fits loosely between the two dogs so as not to interfere with their normal workings. By depressing release key 24, arm 35 is moved around its fulcrum point 36 thereby depressing the free end thereof and causing trip-pin 38 to pass between the enlargements 38' of the dogs 30—31 and separate the same thereby freeing the ratchet wheel 27 to permit the carriage to be moved any desired distance forward or backward as will be readily understood. A detailed description will now be given of the connection for operating the printing devices. Fulcrumed upon the supporting structure 44 within the carriage 19 are a series of depressible levers 45 each pivotally connected at one end with a key 40 and pivotally connected at the other end with a jointed rod 46 extending to a point near the bottom of the carriage and in turn operatively connecting with a printing device B. Each printing device is pivotally supported as at 47 upon the end of an arm 48 fulcrumed as at 49 between a U-shaped socket 50 which is adjustable upon the bottom of the carriage 19, see Fig. 10. Upon each side of each arm 48, which arms are under spring tension as at 51, is a guide-rod 52 of U-shaped cross-section pivoted to a printing device B and to a socket 50. As shown in Fig. 7, each printing device comprises a block 53 the printing face of which is provided with a rubber or other impression member 54 and the back of which block 53 has adjustably mounted thereon a U-shaped socket 55 between which an arm and two guide rods are pivoted. Referring now to Fig. 3, it will be noted that in normal position an appreciable portion of the arms 45 of keys 40 rests in horizontal position upon the flat surface of support 44 so that little or no strain is exerted upon them. With depression of a key 40 a jointed rod 46 exerts a pull upon the fulcrumed end of arm 48 causing same to move against action of a spring 51 toward the opening at the carriage center in the bottom thereof. During this movement, the block 53 pivoted to the end of said arm 48 is turned over upon itself as clearly illustrated at the center of Fig. 3, the guides 52 serving not only to effect turning over of said block but serve to maintain said block in proper vertical printing position. Such movement of an arm and block causes an impression member 54 to imprint a suitable character or letter upon the flat surface C upon which the base of the machine stands as for instance a box, crate, barrel head or the like. A description will now be given of the inking pads D of which there is one for every impression member 54. Supported at the top of carriage structure 19 is a ring 60 struck up from which are a series of spaced ears 61 disposed at an inclination and fixed to each of which is a plate 62, see Fig. 5. Secured in appropriate manner around said plate is felt or the like 63 so disposed that an ink receiving space 64 is present between said felt and plate 62. By this construction ink may be readily poured from a can into said spaces 64. As clearly shown in Fig. 2, an inking pad D is disposed in alinement with each printing device B so that when at rest or in non-printing position an impression member 54 is in abutting relation with a pad. Regarding the ring 60 it is to be noted that ears 65 for forming means of attachment for the springs 51 are also stamped therefrom and that the openings 66 thus formed afford means for the passage through said ring of the jointed rods 46. Rods 67 serve to support the ring 60. The disk 44 is supported above ring 60 by rods 68 secured to said ring. The key-board 25 in turn is supported upon disk 44 by other rods 69. As an inspection of the drawings will show most of the parts may be stamped from sheet metal or the like thus providing a very light weight and comparatively inexpensive construction. The cover 20 being removable provides ready means of access to all working parts. It is thought that from the foregoing description the mode of operation of the machine will be obvious without further description. While I have stated that the machine is particularly adapted for use in connection with boxes, crates, barrel heads and the like, obviously, the machine is capable of use for other purposes for instance the printing of sign boards and similar articles of a flat nature.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. Apparatus of the character stated embracing a base, a releasable cage-like carriage mounted for movement therealong, a continuous series of radially disposed ink-pads mounted within the carriage, a similar series of printing devices also mounted within the carriage and normally in contact with an ink-pad in reversed printing position and means operative for turning said printing devices over upon themselves to printing position.

2. Apparatus of the character stated embracing a base composed of spaced rails, a releasable cage-like carriage mounted for movement therealong, a central keyboard at the carriage top, a continuous series of radially disposed ink pads mounted within the carriage, a similar series of printing devices mounted within the carriage and normally in contact with an ink-pad in reverse printing position, means operative for turning said printing devices over upon themselves to printing position, a carriage feed and a tiltable medium operative between the printing device operating means and said feed for controlling movement of the carriage.

3. Apparatus of the character stated embracing a base formed of a pair of spaced beams, a releasable cage-like carriage having an apertured bottom mounted for movement therealong, a central keyboard at the carriage top, a continuous series of radially disposed ink pads mounted within said carriage, a similar series of printing devices also mounted within the carriage and normally in contact with an ink-pad in reverse printing position and means operative for turning said printing devices over upon themselves to a position an appreciable distance through the carriage aperture and between said beams for printing upon a surface in a plane below that of the base bottom.

4. Apparatus of the character stated embracing a base formed of a pair of spaced beams shaped to rest upon a box or barrel, a releasable cage-like carriage having an apertured bottom mounted for movement therealong, a central keyboard at the carriage top, a carriage feed, a series of ink pads, a series of printing devices normally in contact with an ink pad in reverse printing position, means operative upon depression of the key for turning said printing devices over upon themselves to a position between said beams for printing, and a tiltable disk-like medium operative between the carriage feed and the printing device operating means for controlling carriage movement.

5. Apparatus of the character stated embracing spaced, elongated beams connected at their ends by outwardly curved inverted U-shaped cross-pieces, beveled guide pieces fixed to the beam tops and a releasable carriage provided upon its bottom with beveled guide pieces for coöperatively tracking along said beam guide pieces in relatively interlocked relation.

6. Apparatus of the character stated embracing spaced elongated beams connected at their ends by outwardly curved inverted U-shaped cross-pieces, beveled guide pieces fixed upon said beams and extended therebeyond at each end, a releasable carriage of circular contour provided upon its bottom with beveled guide pieces of a length substantially equal to the carriage diameter for coöperatively tracking along said beam guide pieces in relatively interlocked relation.

7. Apparatus of the character stated embracing a base shaped for resting upon a box or barrel, a releasable cage-like carriage, spaced ink-pads fixed to the carriage top, a series of arms fulcrumed to the carriage bottom, a printing device pivoted to each arm and normally engaging a pad in reverse printing position, means for moving said arms downward to printing position and for simultaneously feeding the carriage and means for turning a printing device over upon itself during the downward movement of an arm.

8. Apparatus of the character stated embracing a carriage of circular contour, vertically disposed arms arranged in a circular series and having fulcrumed relation with the carriage bottom, a centrally disposed key-board having keys grouped at the board center, radially disposed levers connecting with the keys, links connecting said levers and arms, a printing device pivoted to each arm and means operative for turning over upon itself a printing device during movement of an arm.

9. Apparatus of the character stated embracing a carriage of circular contour provided adjacent its top with a ring-like structure having stamped therefrom a circular series of spaced pad holding members and an ink-pad secured to each member, there being an ink receiving space in each member in the rear of a pad.

10. Apparatus of the character stated embracing a carriage provided at its top with a horizontally disposed support, a circular series of key levers fulcrumed thereon in horizontal position, keys for said levers, a circular series of ink-pads fixed below said support, a circular series of printing devices having fulcrumed relation with the carriage base and links connecting said lever and printing devices.

In testimony whereof, I have hereunto signed my name.

THOMAS D. HOOPER, Jr.

Witnesses:
HELEN M. BYRNE,
CLARA E. REVENO.